United States Patent [19]

Davis, Jr.

[11] Patent Number: 4,702,877
[45] Date of Patent: Oct. 27, 1987

[54] METHOD FOR MOLDING CONCRETE BLOCKS OR BRICKS

[76] Inventor: Lindsey B. Davis, Jr., Box 32, Cambridge, Me. 04923

[21] Appl. No.: 815,382

[22] Filed: Dec. 31, 1985

[51] Int. Cl.⁴ .............. B28B 7/12; B29C 33/46; B29C 43/18; B29C 51/10
[52] U.S. Cl. .................... 264/553; 264/220; 264/316; 264/336; 264/511; 264/516
[58] Field of Search ............ 264/220, 316, 336, 516, 264/548, 553, 256, 511

[56] References Cited

U.S. PATENT DOCUMENTS

| Re. 29,945 | 3/1979 | Scott . | |
| 1,584,595 | 1/1927 | Bader . | |
| 2,058,295 | 10/1936 | Burbank et al. | 264/71 |
| 2,926,385 | 3/1960 | Willson, Jr. | 264/548 |
| 3,021,569 | 2/1962 | Lyman | 264/545 |
| 3,113,345 | 12/1963 | Butzko | 425/292 |
| 3,159,695 | 12/1964 | Behringer | 264/516 |
| 3,193,599 | 7/1965 | Crilly | 264/548 |
| 3,492,384 | 1/1970 | Matthews et al. | 264/71 |
| 3,703,572 | 11/1972 | Bellasalma | 264/92 |
| 3,712,771 | 1/1973 | White et al. | 425/126 |
| 3,848,034 | 11/1974 | Schaefer | 264/30 |
| 4,060,364 | 12/1977 | Gras . | |
| 4,098,562 | 7/1978 | Levin | 425/121 |
| 4,213,926 | 7/1980 | Toyoda et al. | 264/74 |
| 4,331,628 | 5/1982 | Ziegler | 264/553 |

FOREIGN PATENT DOCUMENTS 2040214 8/1980 United Kingdom ............... 264/220
2153738 8/1985 United Kingdom ............... 264/336

Primary Examiner—Jan H. Silbaugh
Assistant Examiner—Karen D. Kutach
Attorney, Agent, or Firm—W. G. Fasse; D. H. Kane, Jr.

[57] ABSTRACT

Concrete elements, such as blocks or bricks, are molded or cast by forming in a primary mold cavity a secondary mold made of a portion of a thermoplastic film which has been contacted with a flat heater surface to assure a uniformly heated film portion which is then sucked into the primary mold cavity without wrinkles and filled with concrete mix. The secondary mold with the concrete mix in it is withdrawn, for example, sucked out of the primary mold cavity well before any effective hardening of the concrete mix, so that curing and hardening takes place in the secondary mold outside the primary mold cavity. This early withdrawing is important because it avoids expansion of the curing mix in the primary mold, whereby removal from the primary mold is facilitated. Additionally, the early removal with the aid of the secondary mold assures a more efficient use of the primary molds which are used again while the hardening is still going on in the secondary mold. The apparatus for performing the method includes a turntable and stepwise drive means for sequentially stepping the turntable carrying a plurality of primary molds into cooperation with several work stations which are so controlled that the early withdrawal of the filled secondary mold from the primary mold cavity is assured.

11 Claims, 18 Drawing Figures

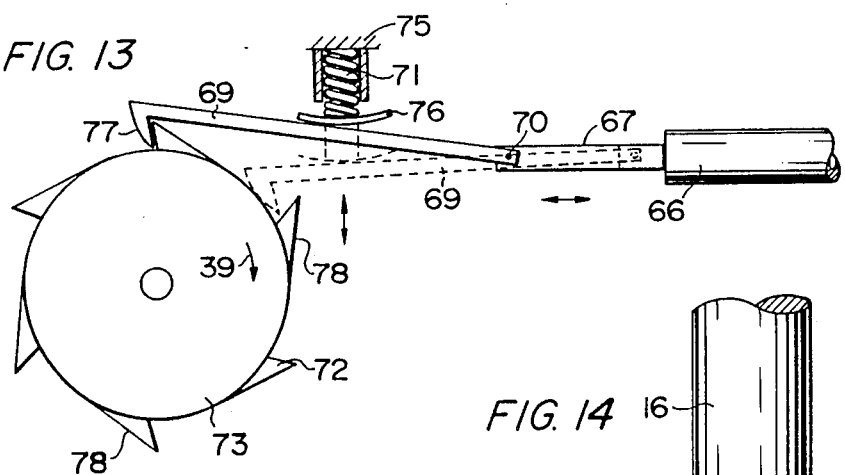
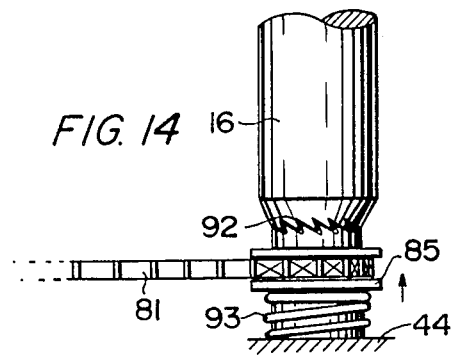
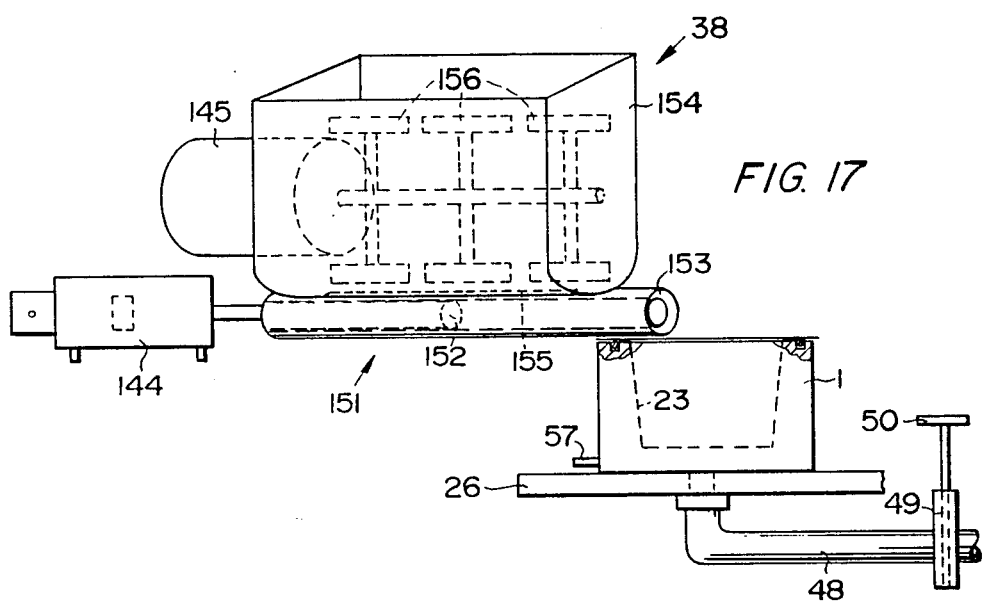

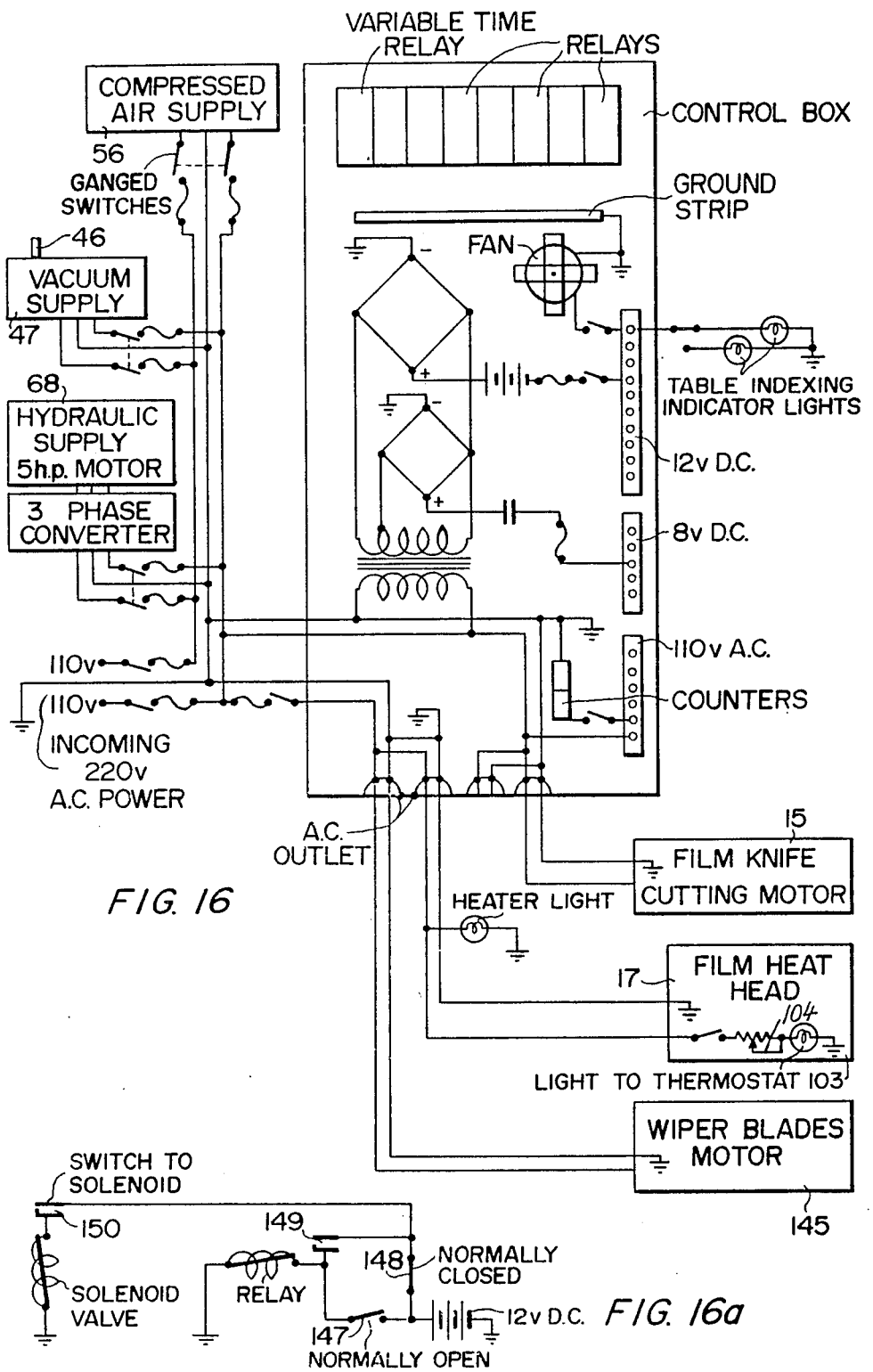

METHOD FOR MOLDING CONCRETE BLOCKS OR BRICKS

FIELD OF THE INVENTION

The invention relates to a method and apparatus for molding concrete blocks or bricks in an open top mold having mold cavity defining walls lined with a thermoplastic film which is moved onto the open top, heated and sucked by vacuum into the mold cavity which is then filled with the concrete mix.

DESCRIPTION OF THE PRIOR ART

U.S. Pat. No. 1,584,595 (Bader) discloses a mold for making concrete blocks. The mold is lined with a rubber lining for facilitating the removal of the finished product and which in turn can be easily removed from the finished article. Such a rubber liner stays in the mold until the concrete blocks are hardened.

U.S. Pat. No. 3,492,384 (Matthews et al) discloses a casting mold which is lined with a thin flexible membrane and the moldable material is placed on the membrane in the mold. Both, the material and the membrane remain in the mold during the setting time and negative pressure is maintained on the membrane during the setting time. The molded article and the membrane are released from the mold by applying a positive pressure to the membrane which is easily removed manually from the finished product.

U.S. Re-Issue Pat. No. 29,945 (Scott) discloses a multiple use flexible elastomeric liner for molds in which concrete faced wall components are made. The purpose of the liner is to impart onto the finished concrete wall sections a surface design. The material of the liner is so selected that repeated use of the liner is possible. However, here again, the liner remains in the rigid mold until the concrete wall panel has set.

U.S. Pat. No. 4,331,628 (Ziegler) discloses a method for preparing a finished concrete structural component in which the mold is also lined with a liner of a pliable thermoplastic film which is heated by infrared radiation so that it becomes sufficiently pliable for pulling the liner into the mold to thereby conform to the mold configuration. The concrete mix is then filled into the mold and the mold is vibrated to compact the concrete mix before it sets. The main purpose of the liner is to provide a good surface quality of the concrete component and to facilitate the removal of the set concrete component from the mold. The concrete component is supposed to have a smooth, nonporous surface. The lining also prevents a premature evaporation of the water from the concrete mix in the mold.

In connection with U.S. Pat. No. 4,331,628 (Ziegler) there remains room for improvement, especially with regard to the uniform heating of the thermoplastic film and with regard to a more efficient use of the molds. More specifically, by irradiating the thermoplastic film with infrared heat as is disclosed by Ziegler, it is not easily possible to assure a uniform heating of the entire volume of any particular film portion and from film portion to film portion for a uniform softening of the thermoplastic film at least over that portion which covers the open top of the mold. Such uniform heating is very important because without it, it is not possible to introduce the film without any wrinkles into the mold cavity. Even the slightest wrinkles are undesirable because they ruin the surface of the finished concrete product. Ziegler teaches using a film as thin as practically feasible, whereby it becomes impossible to use the film lining as a secondary mold.

Further, by leaving the concrete mix within the mold until it is set so that removal of the concrete parts takes place only after they have hardened in their molds, it is not possible to use the molds repeatedly in a rapid sequence and in an efficient manner for mass production purposes. Even short setting times may be substantial and thus would require a large number of molds because even a short hardening time may involve 10 or more hours unless curing agents are used for accelerating the hardening. Even if such curing agents are used the idle time of the molds during hardening time is still undesirable.

Even though a liner facilitates the removal of the finished, hardened component from the mold, it has been found that leaving the cast components in the mold until after substantial hardening has taken place, is detrimental for an easy removal even with the liner, because the curing concrete mix expands and such expansion creates tremendous forces tending to keep the hardened product in the mold which not only makes it more difficult to remove the element from the mold, it also tends to expose the molds to substantial wear and tear.

U.S. Pat. No. 3,712,771 (White et al) discloses a molding system for forming plastic articles. The molds travel on a continuous circuit past seven stations where various lining, filling, curing, and other steps are performed. In the first step, the molds are in effect lined with a thin plastic material, such as polyvinyl chloride, polyethylene, or polypropylene, which is instantaneously heated by a quartz heater to a deformable temperature and is sucked into a mold by a vacuum. In the next step, the lined molds are filled with a plastic foam material that expands to fill the lined mold. The molds have lids that close to permit the foam material to expand only to a certain degree. The thin plastic sheet is fed from a roll and is pulled over each mold, clamped tight, sucked into the mold, and finally cut off. Each step is done automatically after the first mold has been manually started. The lined, filled and closed molds then travel for a relatively large distance (the equivalent of about 13 stations) to allow the foam to cure. Then the molds are opened and manually unloaded. The molds dwell at each station rather than moving continuously.

U.S. Pat. No. 4,098,062 (Levin) discloses a reinforced concrete block making machine. This machine has a circular conveyor belt which moves the concrete blocks from the molding station to a curing station and finally an ejector station. The molds are not lined and the blocks formed must be heated to remove excess moisture and then cooled and dried to complete the curing process. The blocks are removed from the conveyor by a ram or other removal device. The disclosure mentions pigment that can be added to the concrete mixture. The concrete slurry is heated and pumped into the mold cavities under a pressure of about 125 lbs/in$^2$. The blocks formed have the required rigidity to be removed from the mold within a matter of seconds, (column 3, lines 43-46). The mold is also put under pressure before the blocks are removed. This pressure can be on the order of 400 tons to ensure that the mold is completely filled and to produce stronger blocks. A group of blocks is molded every 6 seconds.

U.S. Pat. No. 4,060,364 (Gras) discloses an apparatus to produce molded plastic articles with a turntable carrying a plurality of molds through different stations. The turntable carries presses into which the molds are placed. The plastic material to be formed is already in the molds when they are placed into the presses. The turntable moves the molds to a heating station, a cooling station, and back to the loading (unloading) station.

OBJECTS OF THE INVENTION

In view of the foregoing it is the aim of the invention to achieve the following objects singly or in combination:

to make sure that the thermoplastic film forming a lining in the mold cavity does not wrinkle when it is pulled into the mold cavity, which forms a primary mold, so that the finished product will have a desired smooth surface;

to utilize the lining in the primary mold as a secondary mold so that the mixed concrete can be withdrawn in its secondary mold from the primary mold substantially immediately after filling the secondary mold inside the primary mold, thereby permitting the reuse of the primary mold in a rapid sequence;

to avoid any substantially noticeable or effective hardening of the concrete mix in the primary mold to thereby facilitate the easy removal of the secondary mold together with the concrete mix from the primary mold and to permit the hardening in the secondary mold so that expansion forces resulting from the hardening and curing are substantially prevented from taking place in the primary mold;

to prevent damage to the mold by an early removal of the cast product; and to provide an apparatus for performing the present method in a substantially automated way.

SUMMARY OF THE INVENTION

The invention achieves a uniform heating of that portion of the thermoplastic film which smoothly covers the open top of the mold by contacting the thermoplastic film with a solid heater body having a flat heater surface which uniformly and entirely contacts the portion of the film which needs to be softened so that it may be heated sufficiently for pulling the heated film portion into a primary mold cavity by suction, whereby the heater member itself covers the open top of the mold, thereby avoiding, or at least minimizing any heat loss. The primary mold cavity is then evacuated while it is still closed by the heater body, whereby the softened thermoplastic film is pulled into the primary mold cavity, thereby simultaneously lining the walls of the primary mold cavity with a secondary mold formed of the thermoplastic film. The heater member is then removed from the open top of the mold for opening the secondary mold in the primary mold cavity, whereupon the secondary mold inside the primary mold cavity is then filled with a concrete mix. The secondary mold with the concrete mix therein is then substantially immediately removed from the primary mold prior to any effective hardening of the concrete mix. Thus, expansion of the curing concrete mix inside the primary mold cavity is avoided, whereby the withdrawing is substantially faciliated, and can, for example be accomplished by suction. This early withdrawal prior to any effective or noticeable curing and hardening permits the renewed use of the primary mold cavity while the concrete mix is still curing and hardening in the secondary mold. In its preferred practice the pressure inside the primary mold cavity is temporarily increased during the heating of the thermoplastic film for uniformly pressing the entire film portion against the flat heater surface, whereby the rapid and uniform heating is further improved and the formation of wrinkles during the subsequent suction is avoided. Further, it is preferred to compact the concrete mix in the mold by applying temporarily a static pressure of about 10 to 80 tons per square foot to the mix in the mold and then remove the secondary mold with the compressed mix, substantially immediately.

The apparatus for substantially automatically casting concrete blocks or bricks, in accordance with the foregoing method, has a turntable carrying a plurality of primary mold cavities having open mold tops and a drive operatively connected to said turntable for stepping the turntable into cooperation with a plurality of work stations. The work stations comprise a first station including a solid heating device having a flat surface for contacting a thermoplastic film portion located on said open mold top, said flat surface having an area corresponding at least to the surface area of said open mold top for closing said open mold top when a thermoplastic film portion is being heated. A suction pump evacuates the primary mold to pull a heated thermoplastic film portion into the primary mold cavity, thereby forming a secondary mold in the primary mold cavity. Means for removing the heating device from the primary mold top, open the secondary mold. A second station includes means for filling concrete mix into the open secondary mold inside the primary mold cavity. A third station includes means for removing a filled secondary mold from a primary mold cavity prior to any effective hardening of the concrete mix in the secondary mold in which the concrete mix is cured. The resulting block or brick may be transported in the secondary mold, since the secondary mold simultaneously forms with the curing concrete mix a sufficiently shape retaining unit.

Advantages of the invention are seen in that due to the direct contact between the thermoplastic film portion that needs to be softened, with the flat heater surface, the invention achieves a more uniform, faster heating of a film which generally is thicker than, for example, in the above mentioned U.S. Pat. No. 4,331,628 (Ziegler). More specifically, while Ziegler discloses the use of a thermoplastic film, such as an ethylene vinyl acetate copolymer containing 5 to 25%, by weight, of vinyl acetate, having a thickness of about 0.59 to 6 mils (about 15 to 150$\mu$m), the invention can use the same thermoplastic film material, but having a thickness of about 4 to 12 mils (11 to 300 micrometer). Yet, the invention heats the thicker film more rapidly in about 8 to less than 20 seconds or less due to the direct contact between the flat heater surface and the film. Contrary thereto, Ziegler requires a heating time of at least 20 to 70 seconds and his heating time may last from 1 to 2.5 minutes. These time savings may seem to be insignificant. However, such time savings become very important when mass production is involved as is the case for cast concrete blocks and bricks. Ziegler reaches the required temperature needed for making the plastic film sufficiently pliable in 20 seconds at the earliest. By heating the film as taught herein, the required temperature of about 220° to 260° F. is reached much quicker, in about 10 seconds as stated, with some minor variations in the range of ±seconds allowing for the thickness of the film material.

The invention employs a vacuum in the range of about 3.0 to about 10 inches of mercury and the vacuum is applied for a duration during filling, during vibrating, and preferably until the end of compressing.

BRIEF DESCRIPTION OF THE DRAWINGS

In order that the invention may be clearly understood, it will now be described, by way of example, with reference to the accompanying drawings, wherein:

FIG. 13 is a view in the direction of the arrow A in FIG. 7 showing further details of the stepping drive for the turntable;

FIG. 14 shows a detail of the ratchet drive for the film advance in FIG. 9;

FIGS. 16 & 16a show electric circuit diagrams as used in the present apparatus; and FIG. 17 is a side view, partially in section, of a dosing device for charging measured quantities of concrete mix into a mold cavity.

DETAILED DESCRIPTION OF PREFERRED EXAMPLE EMBODIMENTS AND OF THE BEST MODE OF THE INVENTION

Figure 1:
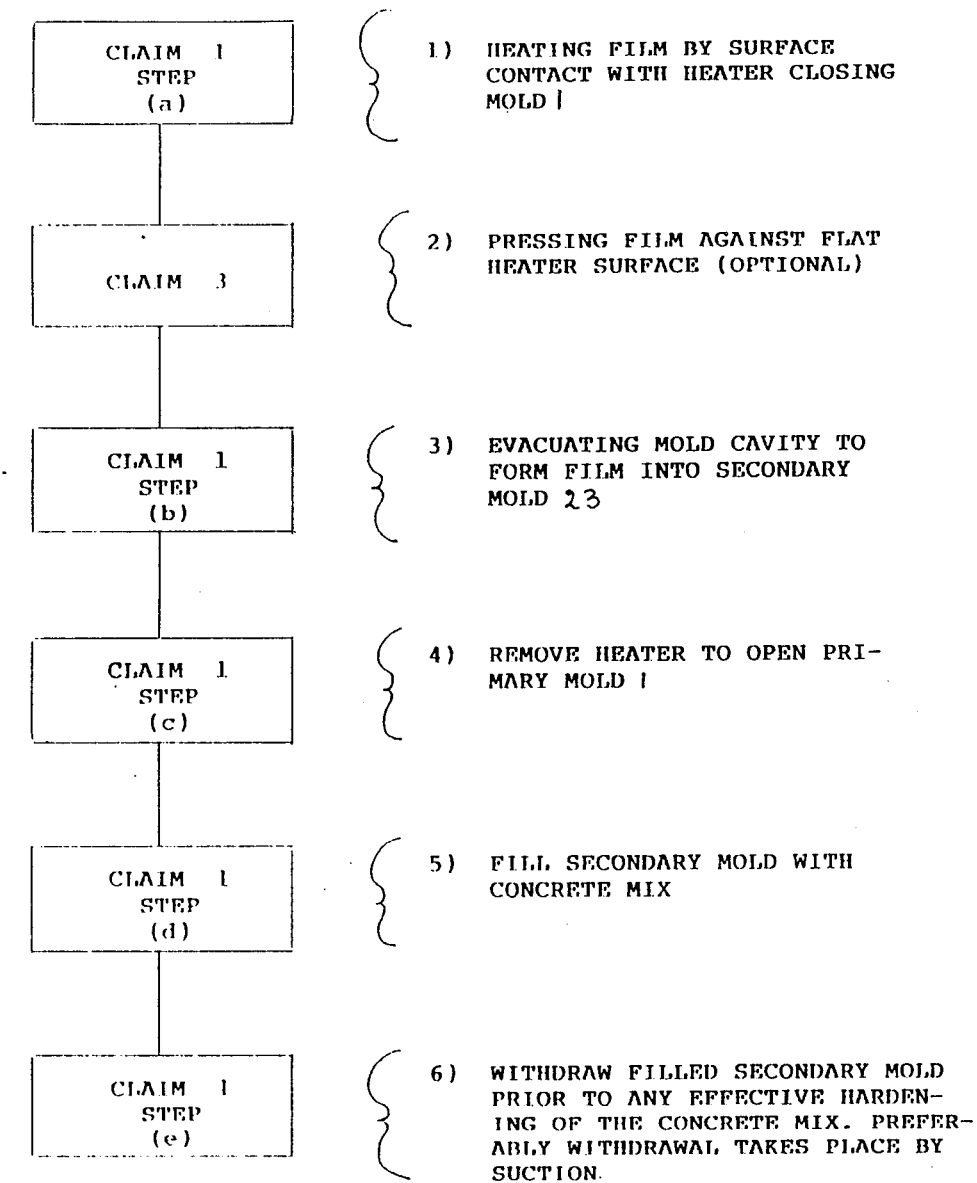
FIG. 1 shows a flow diagram of the present method steps.

Step (a) of FIG. 1 illustrates the heating of the thermoplastic film by a contact with a flat surface of a solid heating device. A perforated plate shown in FIG. 8 forms the flat heating surface which closes the open top of the mold during the heating step. The mold walls enclose a primary mold cavity. Preferably, the film is pulled off a film supply roller shown in FIG. 9, whereby a portion of the film is smoothly drawn onto the open top of the mold with the film in flat contact with the top edges of the mold walls so that the flat heater surface can press the film against the top edges of the mold walls.

The next step in FIG. 1 of temporarily increasing the pressure inside the mold cavity to an internal pressure within the range of about 50 to 90 pounds per square inch during the heating is optional, but preferred, because with the internal pressure the thermoplastic film is uniformly brought into contact and pressed against the flat heater surface, thereby assuring a uniform heating of the film portion that needs to be softened. The increased pressure in the mold during heating further reduces the undesired wrinkling which can be caused by a nonuniform heating of the film portion. In the next step (b), the mold cavity is evacuated to pull the heated film into the mold cavity and to cause it to closely hug the internal surfaces of the mold walls without wrinkling, thereby forming a secondary mold inside the primary mold cavity. The evacuating or negative pressure is in the range of about 3.0 to 10.0 inches of mercury.

The heater surface is maintained at a uniform temperature within the range of about 220° to 260° F. and the contact between the flat surface and the thermoplastic film is maintained for about 8 to 16 seconds, preferably 10 seconds or less. The film has a thickness of about 100 to 300 micrometer corresponding to about 4 to 12 mils, which has been found to be sufficient to form the secondary mold capable of retaining the shape of the concrete mix even after withdrawal from the primary mold cavity and even before the concrete mix has started to effectively harden. The actual temperature for heating the film will depend on specifications provided by the manufacturer of the film material and will stay below the melting point.

When the secondary mold has been formed in the primary mold cavity, the mold is opened by removing the heater from the mold top as indicated in step (c). The concrete mix is then filled into the open mold, more specifically, into the liner forming the secondary mold as indicated in step (d). Following the filling a compaction may be performed, if desired, for example, by vibrating the mold with a frequency in the range of about 8 to about 12 kHz. A conventional electrical or air vibrator may be used for this purpose. In addition, or in the alternative to the vibrating, the concrete mix may be compacted by applying pressure to the surface of the concrete mix in the mold. A volume reduction by the application of pressure to about 90% of the original volume has been found to be satisfactory. The compaction pressure may be within the range of about 10 to 80 tons per square foot. In any event, the pressure will be sufficient to reduce the volume of the uncompacted concrete mix by about 10%. Thus, the dosing of the uncompacted concrete mix volume will be sufficiently larger to exactly fill the mold cavity when compaction is completed.

The filled secondary mold is withdrawn from the mold cavity immediately after the compacting and still prior to any effective hardening of the concrete mix as indicated in step (e). Preferably, the secondary mold with its concrete fill is withdrawn by suction. This is greatly facilitated by the secondary mold with its edges holding on to a suction head shown in FIG. 11 to be described below.

Figure 3:
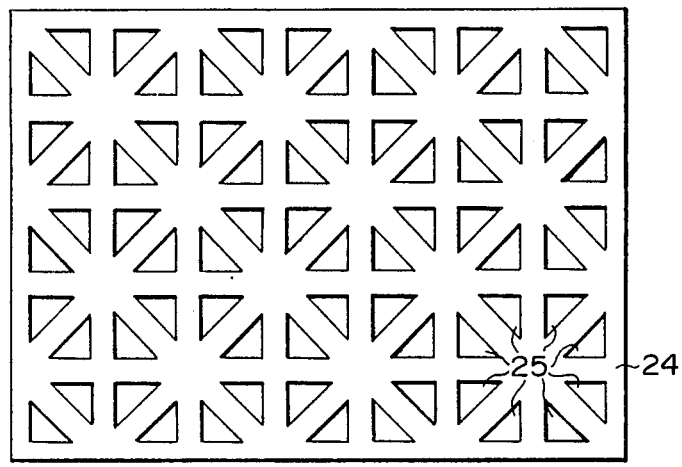
FIG. 3 shows a thin metal sheet with a hole pattern punched out of the sheet for insertion into the bottom of the primary mold cavity for providing a surface of the finished brick or block with a corresponding pattern.

The surface of the finished concrete block or brick may be decorated by inserting a pattern template into the bottom of the primary mold cavity. FIG. 3 shows one example of such a pattern which may be a stamped out plastic sheet or a piece of sheet metal. Different types of concrete mix may be filled into the secondary mold, for example, to provide a colored surface.

Incidentally, the term "effective hardening" in this context means a hardening where the respective expansion of the concrete mix begins to increase the pressure inside the mold cavity to such an extent that withdrawal of the secondary mold with the mix therein requires a noticeably larger force than is necessary prior to such hardening.

Figure 2:
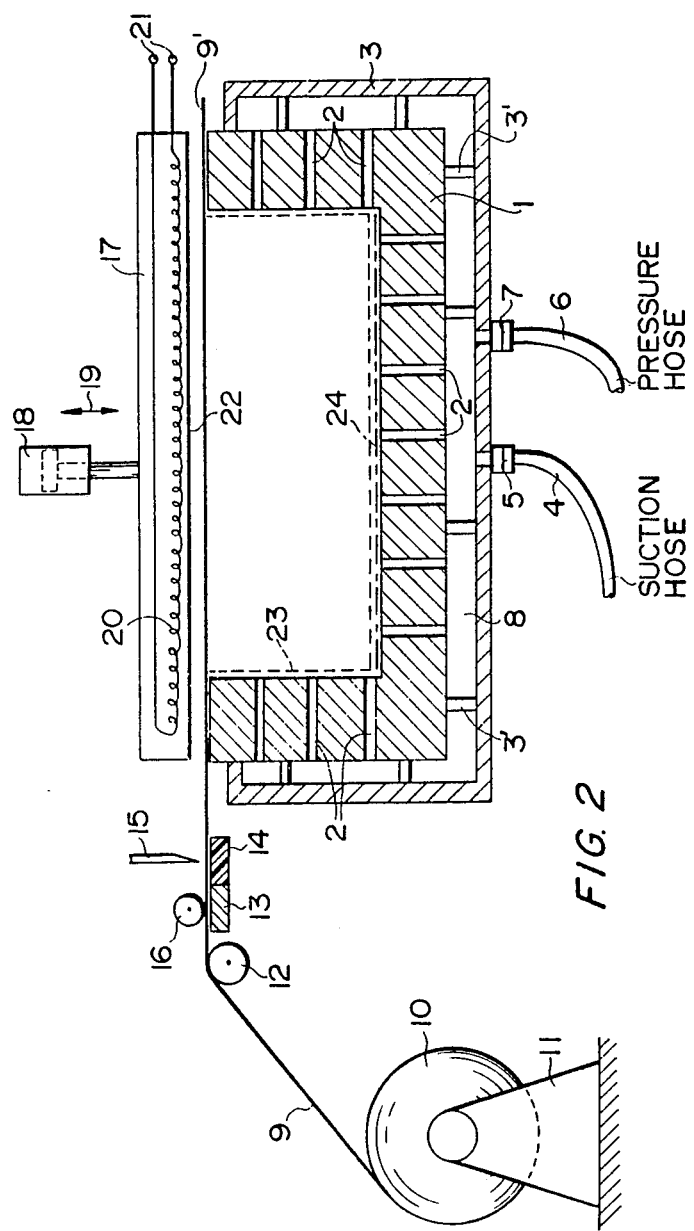
FIG. 2 shows a sectional view through a primary mold cavity used according to the invention.

FIG. 2 shows a primary mold 1 forming the primary mold cavity provided with air holes 2 and surrounded by an enclosure 3 connected to a suction hose 4 through a quick coupling or connector member 5 and to an air pressure hose 6 through a quick coupling or connector member 7. The enclosure 3 is spaced by ribs 3' from the mold 1 and provides a space 8 around the outer walls of the primary mold 1 so that all the air holes 2 may be exposed either to positive or negative pressure. For this purpose the suction hose 4 and the air pressure hose 6 are connected to respective negative or positive pressure sources of conventional construction.

The thermoplastic film 9 is reeled off a film supply roller 10 conventionally mounted to a machine frame 11 which may also support the mold 1 and its enclosure 3. The film 9 may be pulled by a mechanical device or manually onto the top edges of the mold walls forming the open top of the primary mold 1. Attention must be paid to pulling the film with a uniform stretching onto the open top of the primary mold 1 so that the film portion 9' covering the open top is free of wrinkles.

A guide roller 12 guides the film 9 onto a cutting board 13 having a replaceable counterholding edge 14, for example of nylon, located for cooperation with a knife 15 which is movable up and down or cross-wise for cutting off the portion 9'. A down holder, for example, in the form of a positively driven roller 16, makes sure that the leading end of the film 9 does not slip off the cutting board 13 when the film portion 9' is being cut off. The roller 16 is intermittently driven, so that with each step the proper length of film is advanced for the portion 9'.

Figure 8:
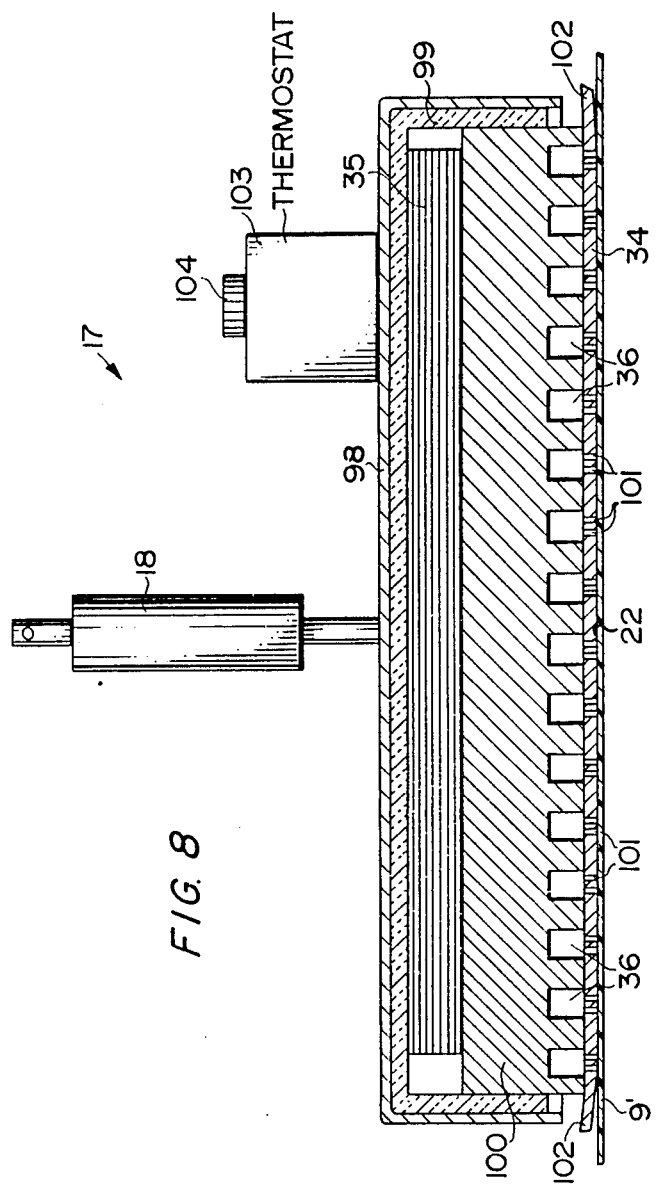
FIG. 8 shows a solid heating device used in the first work station for uniformly heating a portion of a plastic film material.

A solid heating device 17 is movable up and down, for example, by a piston cylinder device 18 as indicated by the double arrow 19. The heating device 17 is provided, for example, with an electrical heating coil 20 connected with its terminals 21 to a source of electrical power. The heating device 17 has a downwardly facing flat heating surface 22 which is large enough to intimately contact the entire surface area of the film portion 9' at least to that extent which covers the open top of the mold 1. Relative movement between the mold 1 and the heating device 17 may also be accomplished in a lateral manner, for example, by rotating the mold 1 and its enclosure 3 in a horizontal plane, whereby the mold 1 is moved out of the space below the heating device 17 and into cooperation, for example, with a filling station for filling concrete mix into the mold. Further details of the heating device are shown in FIG. 8.

When the film portion 9' has been sufficiently heated, preferably after the primary mold cavity closed by the heating device 17 has been pressurized through the pressure hose 6 as indicated above for pressing the film smoothly against the flat heating surface 22, the positive pressure is shut off through a valve and negative pressure is applied through the suction hose 4, thereby pulling the film portion 9' into the primary mold cavity to form a secondary mold as indicated by the dashed line 23. Prior to the closing of the mold by the heater 7 and prior to pulling the film portion 9' onto the open top of the mold, a pattern member 24 as shown in FIG. 3 may be inserted into the bottom of the mold. It has been found that the pattern member with its apertures 25 permits the film portion 9' to closely hug the contours of the pattern member 24 in response to the suction applied through the air holes 2, thereby providing the facing surface of the concrete element with the desired pattern. This pattern is maintained by the film forming the secondary mold even if the secondary mold with the concrete mix therein is withdrawn from the primary mold prior to any effective hardening of the concrete mix.

Figure 4:
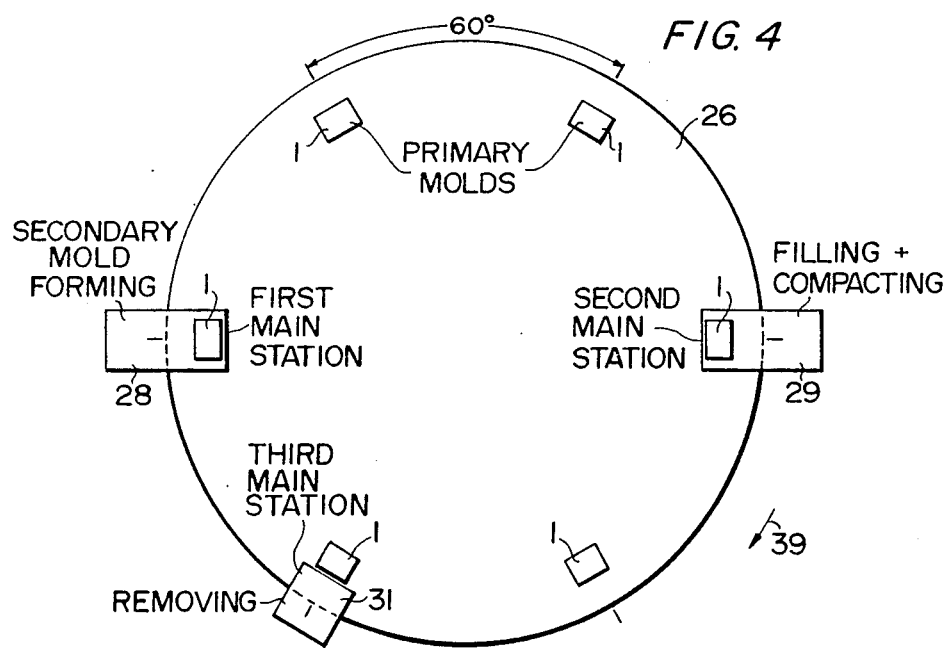
FIG. 4 is a simplified top plan view of a turntable for carrying a plurality of molds through three work stations in performing the present method.

FIG. 4 shows a top plan view of a turntable 26 carrying a plurality of primary molds 1 spaced, for example, at 60° intervals. The primary molds 1 form a plurality of primary mold cavities having open mold tops. The turntable 26 is driven by an indexing turntable drive 27 to be described in more detail below. The turntable drive 27 steps the turn table 26 in the direction of the arrow 39 into cooperation with a plurality of operating stations including at least a first main station 28 in which secondary molds 23 are formed in the primary mold cavities. The heating device 17 and the negative pressure are used for forming the secondary molds 23. The heater 17 has a flat surface 22 for contacting and uniformly heating the thermoplastic film portion 9' located against the surface 22. The size of the flat surface area 22 corresponds at least to the surface area of the open mold top for closing the open mold when a thermoplastic film portion 9' is being heated. The first main station 28 further includes the components for evacuating the primary mold cavity to pull a heated thermoplastic film portion 9' into the primary mold cavity for forming the secondary mold in the primary mold cavity. A piston cylinder device 18 is used for removing the heater 17 from the primary mold cavity, thereby opening the secondary mold 23. A second main station 29 is located in such a position that it can successively cooperate with the individual molds rigidly secured to the turntable 26. The second main station 29 includes a concrete mix filling device 30 to be described in more detail below. A third main station 31 is also arranged for successive cooperation with the individual molds for removing a filled secondary mold from a primary mold cavity prior to any effective hardening of the concrete mix in the secondary mold. For this purpose the third main station 31 includes a removing device 32 to be described in more detail with reference to FIG. 11.

Figure 5:
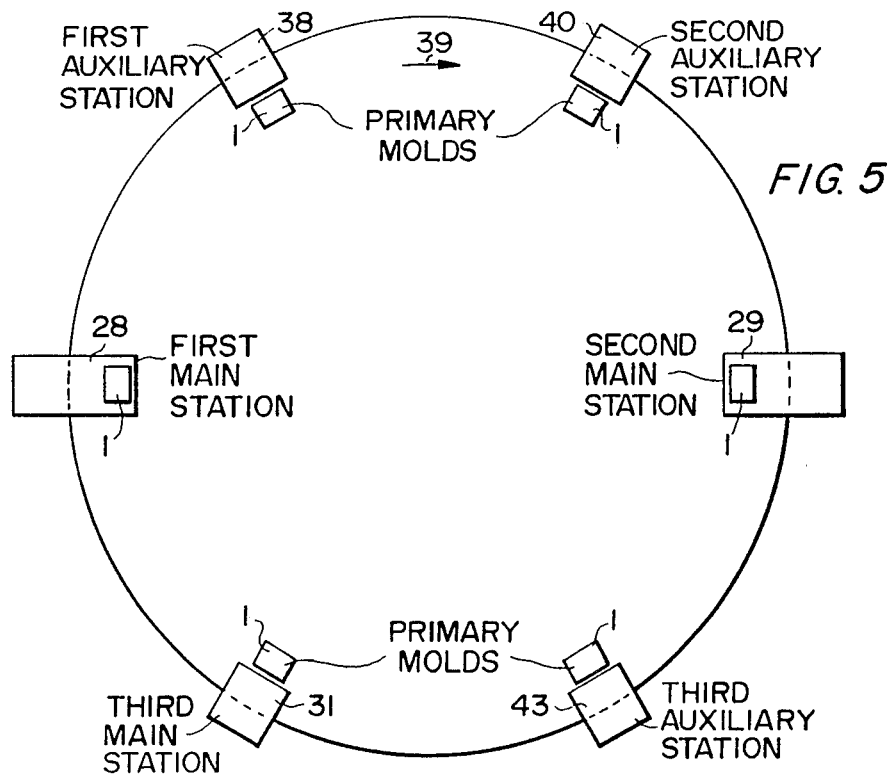
FIG. 5 is a top plan view similar to that of FIG. 4, but showing six work stations arranged around the turntable.

FIG. 5 is a view similar to that of FIG. 4, but showing in addition to the first, second and third main stations 28, 29, and 31 three auxiliary stations 38, 40, and 43 arranged for cooperation with the individual primary molds 1 as they index past these stations. In the first auxiliary station 38, which is located one step of 60° next to the first main station 28, as viewed in the indexing direction 39, a first type of concrete mix is filled into the secondary mold for forming a surface layer on the finished concrete brick. This first type of concrete mix may include a concrete coloring powder or the like, as is conventional. A second auxiliary station 40 is located between the first auxiliary station 38 and the second main station 29. A vibrator 41 driven mechanically or electrically and vibrating for example at a frequency in the range of 8–12 kHz may be used in the secondary auxiliary station for compacting the first type of concrete mix, which fills the secondary mold cavity only partially, for example, 10–20% of the volume of the secondary mold.

A second type of concrete mix is filled into the secondary mold in the second main station 29, whereby the second station also includes a device 37 for compacting the second type of concrete mix in the secondary mold, while the secondary mold is still in the primary mold in the second main station 29. A third auxiliary station 43 is located downstream of the second main station 29 and upstream of the third main station 31. The third auxiliary station may comprise pressure supply means for loosening a secondary mold filled with compacted concrete mix from the primary mold cavity before any effective hardening.

Figure 6:
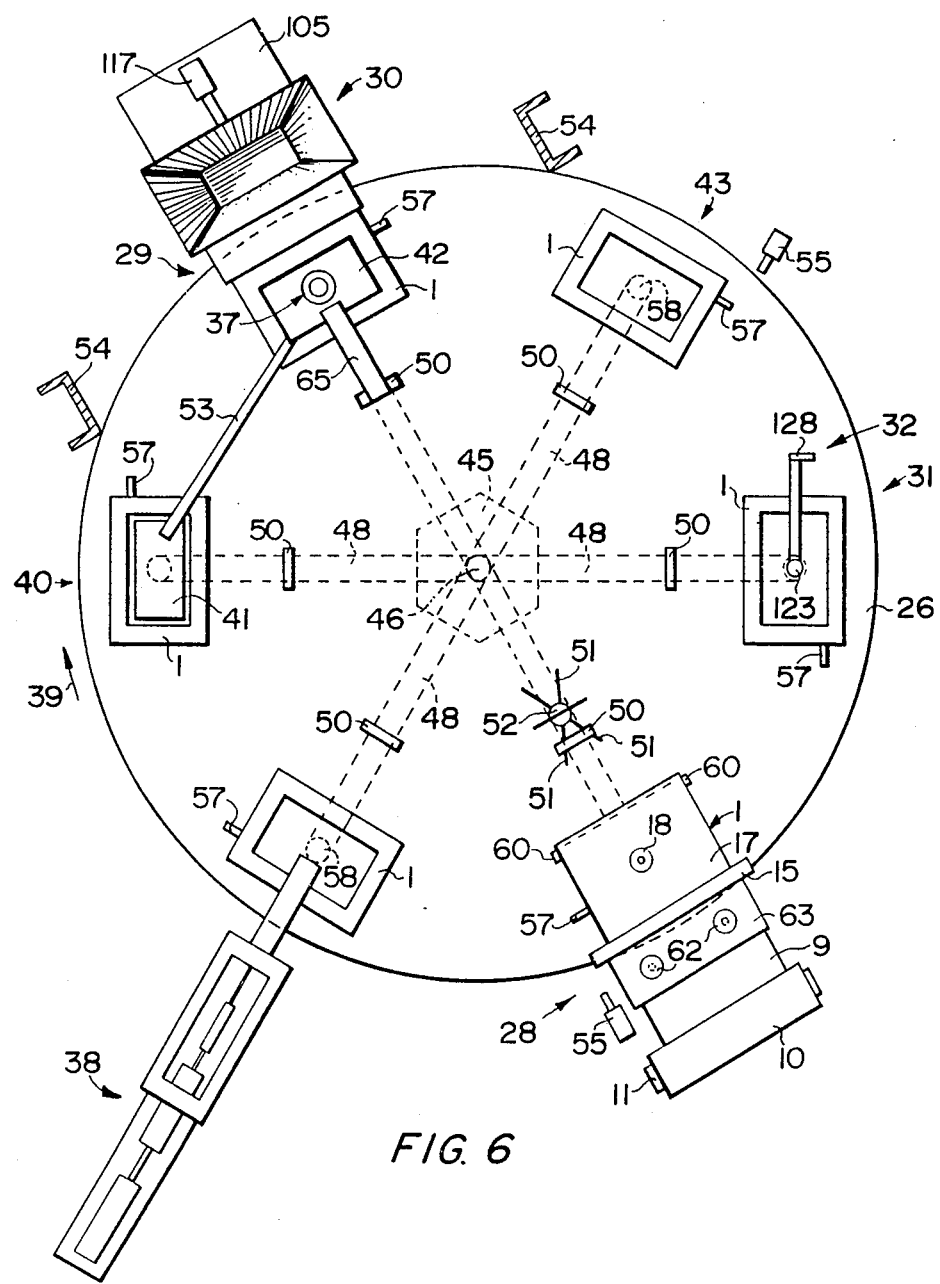
FIG. 6 is a top plan view of the turntable similar to that of FIG. 5, but showing further details of the individual work stations.
Figure 7:
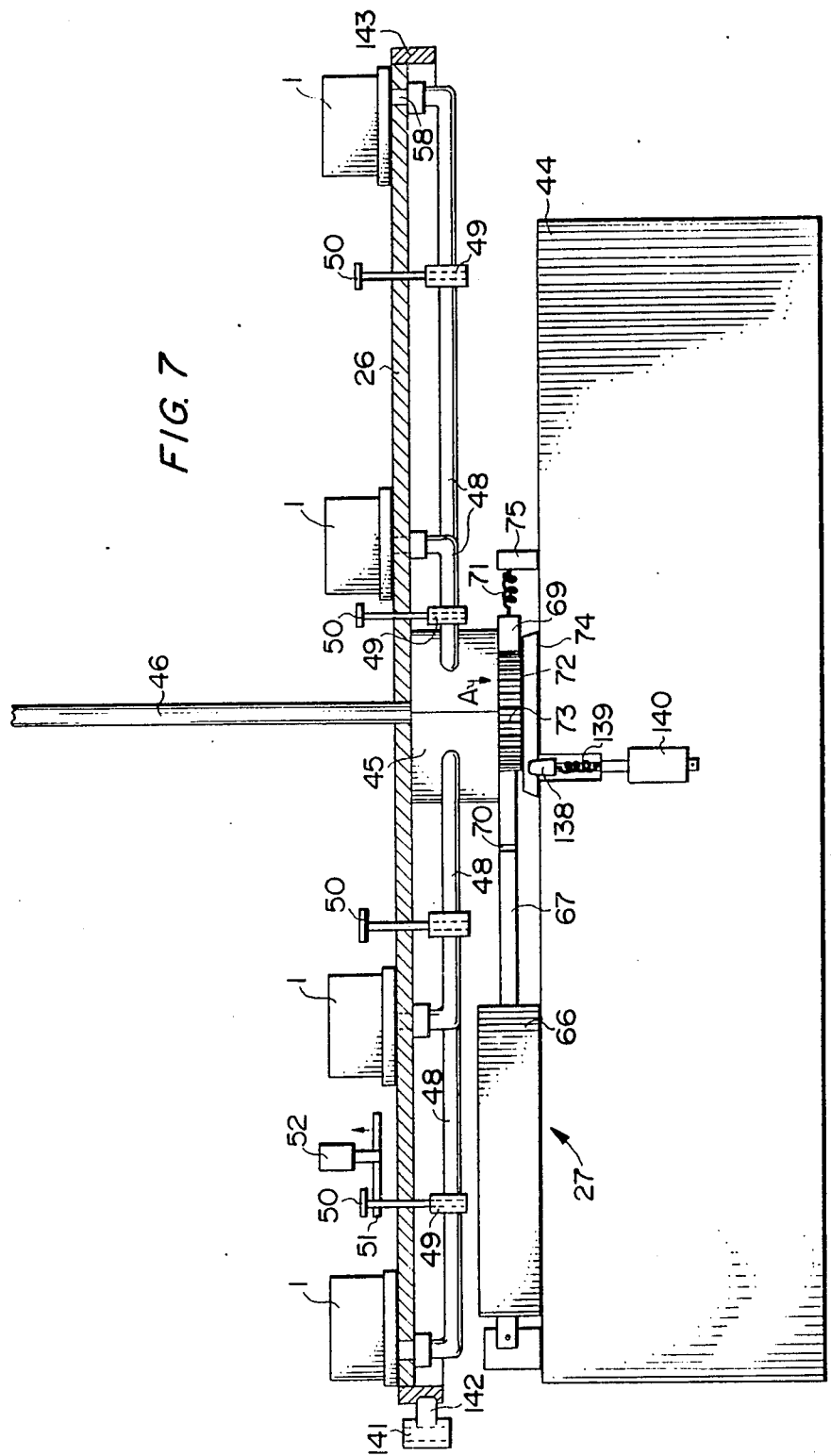
FIG. 7 is a side view of the turntable shown in FIG. 6 to illustrate the drive for stepping the turntable.

FIG. 6 shows that each primary mold cavity of the primary molds 1 is connected to a vacuum supply manifold 45 located underneath the turntable 26 as also shown in FIG. 7. The manifold 45 rotates with the turntable 26 and is connected through a vacuum supply pipe 46, which may also rotate with the table 26 and which is connected to a source of vacuum 47 of conventional construction and shown in block form in FIG. 16. A conventional coupling, not shown, is provided between the vacuum supply 47 and pipe 46 to permit the rotation of the pipe 46 relative to the stationary vacuum supply 47. Six vacuum conduits 48 lead from the manifold 45 to the individual primary mold cavities 1. Each vacuum conduit 48 is provided with a slide valve 49 having an operating handle 50 reaching through the turntable 26 for opening the slide valve in the first main station 28 and in the second main station 29.

Referring briefly to FIGS. 6 and 7 in conjunction, the handle 50 of the valve 49 presently in the first main station 28 is being lifted by two fingers 51 rotatably secured to the piston rod of an air cylinder 52. The air cylinder 52 is stationary, mounted in the first main station 28. As the turntable 26 is stepped, the handles 50 move into the space between two fingers 51, which are then lifted by the piston cylinder 52 to open the respective valve 49. Thus, the valve 49 in the first main station 28 is being opened, the valves 49 in the first and second auxiliary stations 38 and 40 are open and the valve 49 in the second main station 29 is being closed, as will be described in more detail below, and the valves 49 in the stations 43 and 31 are closed. Accordingly, suction is supplied to the primary mold cavity 1 during the formation of the secondary mold 23, during the first partial filling, during the vibrating, and during the compressing in the second main station 29.

FIG. 6 also shows that the vibrator 41 is connected to the press 42 by an arm 53 for lowering and lifting the vibrator 41 in unison with the lowering and lifting of the compacting press 42. The compacting device 37 with its press 42 is mounted to upright frame members 54 by structural details not shown. FIG. 6 further shows, that for example, in the second auxiliary station 43 and in the first main station 28 a piston cylinder device 55 is provided which carries at its piston rod a hose, not shown, but connected to the compressed air supply 56 shown symbolically in FIG. 16. The end of the flexible hose coming from the compressed air supply 56 is provided with an air discharge valve in the manner of a conventional nipple for filling a car tire with compressed air. Each primary mold 1 is also provided with an air inlet valve 57 to be connected at the proper timing temporarily to the air outlet nipple as the latter is being moved onto the valve 57 by the piston rod of the piston cylinder device 55. The air inlet valve 57 may be of the type used in vehicle wheels. In the third auxiliary station 43, the temporary introduction of air into the primary mold cavity loosens the secondary mold from the wall surfaces of the primary mold cavity. In the first main station 28 the temporary introduction of air pressure into the primary mold cavity smoothes the film portion 9' against the flat surface 22 of the heater 17.

Figure 12:
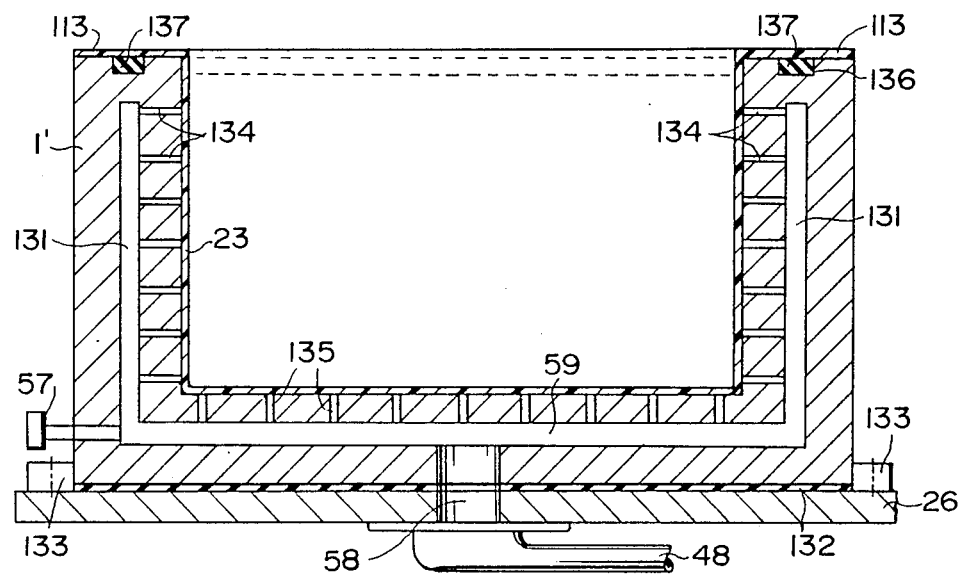
FIG. 12 shows a sectional view through a modified primary mold cavity.

Incidentally, each primary mold 1 has an opening 58 aligned with a respective hole through the turntable 26 leading into the respective vacuum conduit 48 for evacuating a space 59, please see FIG. 12. The space 59 also serves as a compressed air space, when the valve 57 is connected to the mentioned nipple. FIG. 6 also shows two arms 60 for holding a plate 61, which will prevent a film portion 9' from falling into the mold cavity, as will be described in more detail below with reference to FIG. 9. The same applies with regard to the hold-down cylinder 62 and the hold-down or straight edge 63.

As mentioned above, the valve handle 50 is moved downwardly for closing the respective valve 49 in the second main station 29. This valve closing is accomplished by an arm 65 secured to the compacting press 42. Accordingly, when the compacting press 42 moves downwardly, the respective valve 49 is simultaneously closed.

The drive mechanism for the turntable 26 will now be described with reference to FIGS. 7 and 13. A hydraulic piston cylinder device 66 having a piston rod 67 is mounted on the machine bed 44 and supplied from the source 68 of hydraulic pressure. A drive pawl 69 is pivoted at 70 to the piston rod 67. A spring 71 urges the drive pawl 69 into engagement with the ratchet teeth 72 of a ratchet drive wheel 73. The ratchet drive wheel 73 is rigidly secured to the manifold 45, which in turn is rigidly secured to the turntable 26. The entire structure is rotatably mounted by a bearing 74 on the machine bed 44. The spring 71 is mounted with one end to a bracket 75 secured to the machine bed 44. Preferably, the end of the spring 71 bears against the drive hook 69 through a slide shoe 76, as shown in FIG. 13. Incidentally, FIG. 13 is a view in the direction of the arrow A in FIG. 7. When the piston rod 67 moves to the right the drive pawl 69 engages a ratchet tooth 72 and thereby drives the turntable one step of 60°, for example, in the clock-wise direction, as indicated by the arrow 39. When the piston rod 67 reaches its right hand end position, the drive hook 69 is in the dashed position shown in FIG. 13. At this point no further drive takes place and the piston rod moves to the left, whereby the curved surface 77 of the pawl end rides up on the ramp portion 78 of the ratchet wheel for engagement with the next ratchet tooth 72. This drive of the turntable 26 takes place in a timed sequence depending on the dwell time required in each of the six stations mentioned above. For example, providing a 10 seconds dwell time in each station would result in one revolution per minute, if there are six ratchet teeth on the drive wheel 73, as shown for example.

The feed advance of the plastic material film 9 from the roller 10 will now be described with reference to FIGS. 9 and 14, whereby FIG. 14 is a view in the direction of the arrow B in FIG. 9. A chain drive 79 has a guide sprocket 80 and a drive sprocket 85. A chain, having an upper run 81 and a lower run 82, interconnects the two sprockets 80 and 85. A drive arm 83 is connected to the lower run 82 at one end thereof and to a piston rod 84' at the other end. The piston rod 84' is driven by a piston cylinder device 84, whereby the drive is transmitted onto the roller 16 with the aid of a free-wheeling clutch 92, one portion of which is rigidly connected to the drive sprocket 85 and the other portion of which is rigidly connected to the roller 16 for the stepwise feed advance of the film 9 through a film guide channel 95. A spring 93 urges the drive sprocket 85 with its free-wheeling clutch portion of the clutch 92 into engagement with the other free-wheeling clutch portion of the roller 16. When the lower run 82 of the chain drive moves to the right in FIG. 9, the upper run 81 moves to the left, thereby rotating the roller 16 counterclockwise, as indicated by the arrow 94, through the engagement of the clutch members 92 for a sufficient extent to advance the required length of film to cut off a portion 9'. When such a portion has been fed onto the support plate 61 the holddown plate or straight edge 63 is pressed downwardly against the cutting board 13 against the force of the springs 64, which tend to hold the edge 63 in an up position. When the hold-down or straight edge 63 is in the operating position under the force of the piston cylinder device 62 the knife 15 is operated to sever the portion 9' from the film 9.

The heater 17 is then slightly lowered to pick up the film portion 9' from the support plate 61, which initially prevents the film portion from falling into the primary mold cavity 1. It has been found, that the film portion sticks to the heated flat surface 22 of the heater 17, which after pick-up of the film portion is moved slightly up again, to permit the removal of the plate 61. Such removal is accomplished by the air cylinder 86 having a piston 89 with two piston rods 87 and 88. The piston rod 87 is connected to the arm 60 or to both arms 60 for supporting the plate 61. The piston rod 88 has a slot 90. A connecting slide pin 91 slides back and forth in the slot 90 and connects the piston rod 84' in a movable manner to the piston rod 88.

Figure 9:
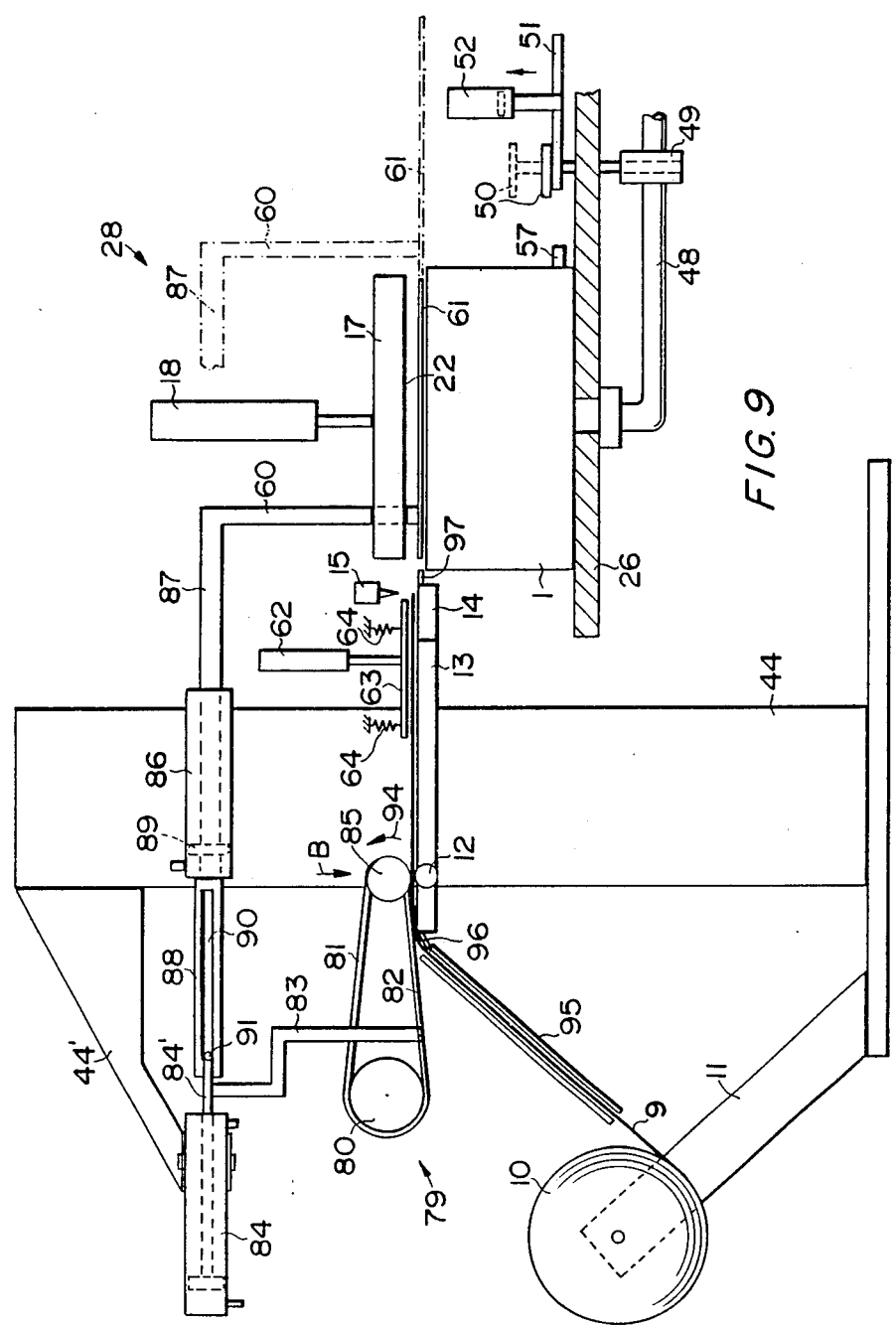
FIG. 9 is a side view showing further details of the first work station including a device for supplying plastic film to the space between a mold and the heating device.

Referring further to FIGS. 9 and 14, the film advance operates as follows. As long as the connecting slide pin 91 rides in the slot 90 of the piston rod 88, the roller 16 rotates counterclockwise thereby feeding film onto the now stationary plate 61. When the connecting slide pin 91 reaches its right hand end position, the heater 17 has already picked up the film portion from the plate 61 and air is now admitted to the cylinder 86 to the left of the piston 89, whereby the plate 61 is moved into the dashed line position out from under the heater 17, which may now be pressed against the surface of the top edge of the mold 1 with the thermoplastic film held in position between the heater surface 22 and top edge of the mold 1. By moving the piston 89 to the right, the left hand end of the piston rod 88 comes into contact with the connecting slide pin 91. Now the piston in the cylinder 84 is moved to the left again, thereby taking along the piston rod 88, 87 and moving the plate 61 again under the heater 17 for cooperation with the next mold, which has been moved under the heater 17 by the indexing of the turntable 26. The return movement of the piston rod 84' does not rotate the roller 16 due to the disengagement of the free-wheeling clutch members 92 when the lower run 82 of the chain drive moves to the left and the upper run 81 moves to the right, please see also FIG. 14.

In order to properly guide the film 9 from the guide channel 95 onto the cutting board 13, a guide tongue 96 may be provided for bridging the gap between the end of the guide channel 95 and the entrance end of the cutting board 13. Similarly, a guide tongue 97 may bridge the gap between the counterholding edge 14 and the plate 61. The piston cylinder device 84 is mounted to the frame member 44 by a support bracket 44'.

FIG. 8 illustrates further details of the heating device 17 for heating the film 9 or rather a portion 9' of the film to the proper temperature for the above described formation of the secondary mold 23. The heating device 17 comprises a housing 98 lined with a heat insulating jacket 99 and having mounted therein an aluminum plate 100 provided with air ducts 36 and carrying electrical heating wires or strips 35 for bringing the plate 100 to a uniform temperature. The above mentioned smooth surface 22 is provided by a perforated plate 34 having air holes 101 lined up with the air ducts 36 in the aluminum plate 100 for facilitating the release of the film portion 9' from the surface 22 when the film portion 9' is being sucked into the primary mold cavity 1. Normally, it is sufficient for the ducts 36 to be connected to atmosphere. The perforated heater plate 34 may be provided with raised edges 102 at least at the inlet end so that the film 9 may move without hindrance into the space above the plate 61, shown in FIG. 9, and the smooth surface 22 of the perforated plate 34.

It is possible to replace the transporting of the film portion unto the top edges of the mold 1 by mounting the heating device 17 for horizontal movement, thereby avoiding the support plate 61 and its drive members. The film portion 9' would temporarily adhere to the plate 34 due to the heat or by briefly reducing the air pressure in the ducts 36 through the holes 101.

Further, the heating device 17 is provided with a conventional thermostat 103 adjustable with a knob 104 to provide the required temperature setting.

Figure 10:
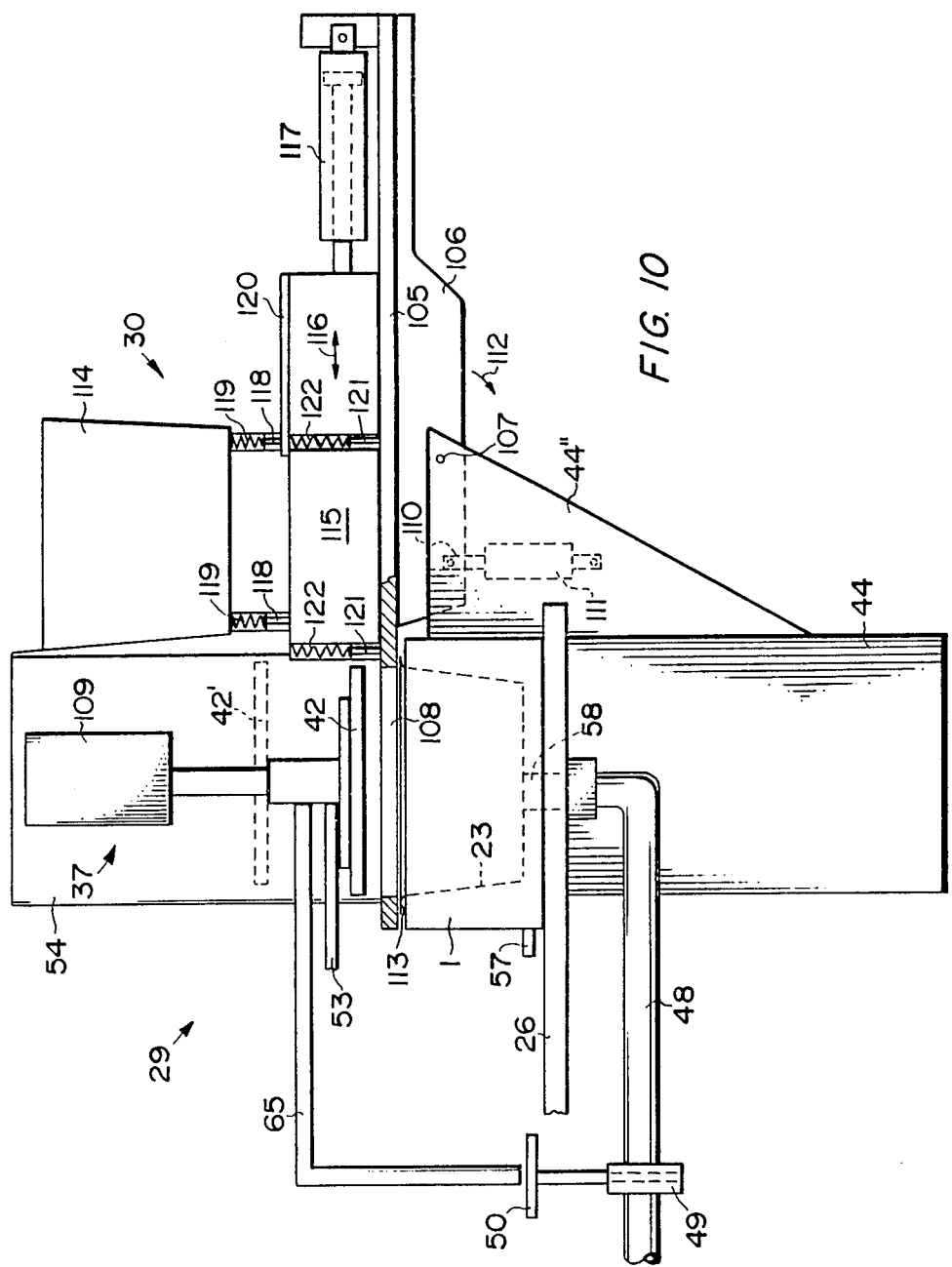
FIG. 10 shows a side view of the work station in which the molds are filled with concrete mix including a dosing device.

FIG. 10 shows the second main station 29 with the filling device 30 for charging the secondary mold 23 with a predetermined quantity of concrete mix. The filling device 30 comprises a filling plate 105 mounted on a bracket 106 which in turn is pivoted at 107 to the machine bed or frame 44''. The left end of the filling plate 105 has a hole 108 sized to correspond substantially to the opening of the mold cavity. The thickness of the filling plate 105 determines an excess volume of concrete mix, about 10% of the volume of the primary mold cavity, which is then compressed with the aid of the compacting press 42 driven by a piston cylinder 109 forming part of the compacting device 37. The press 42 forms a plate fitting properly into the hole 108. The compacting pressure is preferably in the range of about 10 to about 80 tons per square foot.

The mounting bracket 106 is connected to the piston rod 110 of a piston cylinder 111 for slightly pivoting the filling plate 105 about the pivot 107 as indicated by the arrow 112 to slightly lift the left hand end of the filling plate 105 above the top edge of the primary mold, so as not to disturb the thermoplastic film edges 113 forming part of the secondary mold 23 as the turntable 26 moves a primary mold 1 into position under the hole 108. Once the turntable 26 is stationary again, the filling plate 105 is brought back into the position shown in FIG. 10.

The filling device 30 comprises a hopper 114 containing the concrete mix. The hopper 114 is mounted to the machine frame member 44 in a stationary position above the filling box 115, which is movable back and forth, as indicated by the arrow 116, with the aid of a piston cylinder device 117 mounted to the filling plate 105. The filling box 115 is so dimensioned, that it provides the exactly required volume of mix to initially fill the secondary mold 23 and the space provided by the filling hole 108. When the filling box 115 is moved to the left the compacting press 42 is out of the way in an upward position, as shown by the dashed line 42'. The lower end of the hopper 114 is surrounded by a wiper skirt 118 which is biassed by springs 119 against the top edge of the filling box 115. At least the left and right side wall of the skirt is provided with a wiper member. In both instances, the wiper is made of a relatively hard rubber for cleaning the top edge of the filling box 115 and the surface of a gate plate 120, which is moved in unison with the box 115 by the piston cylinder device 117 for closing the bottom of the hopper 114, when the box 115 is in the position above the filling hole 108. At least the left and right side walls of the filling box 115 are also provided with wiper blades 121 biassed by springs 122 for cleaning the top surface of the filling plate 105. The piston cylinder devices 109 and 117 are connected by conventional pressure conduits to the respective source of pressure.

Incidentally, the downward extent of the stroke of the compacting press 42 is so determined, that the bottom surface of the press 42 is located at the same level as the bottom of the filling plate 105 and thus substantially at the level of the top edge 113 of the secondary mold 23, so that the latter is completely filled with compacted concrete mix.

Figure 11:
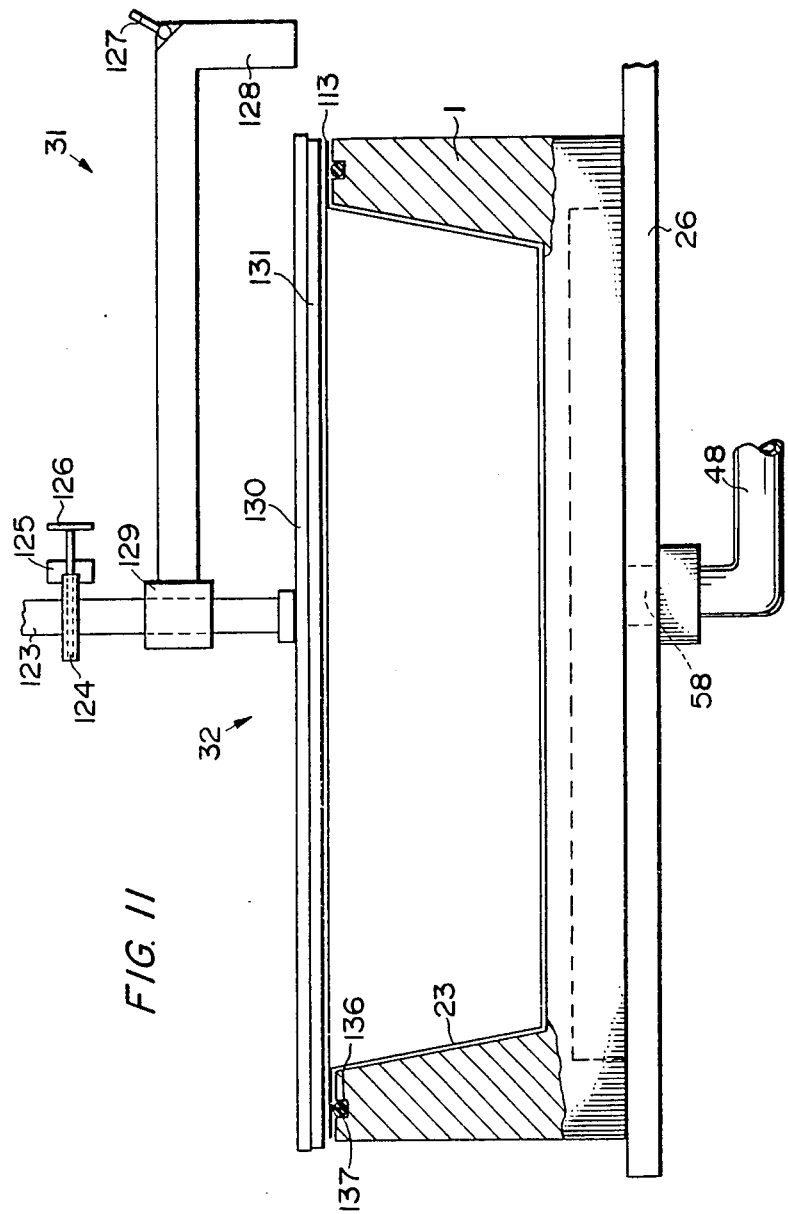
FIG. 11 is a side view of a mold in a discharge station for removing a secondary mold filled with concrete mix from the primary mold cavity.

FIG. 11 shows the removing device 32 in the third main station 31 for removing the not yet effectively hardened concrete elements from the mold 1 together with the secondary molds 23. The removing device 32 comprises a rigid suction pipe 123 connected at the one end to a source of reduced pressure to provide the necessary suction, which is controlled through a valve 124. The valve 124 may be operated by a solenoid 125 or manually through a handle 126. The solenoid may be energized through the switch 127 connected to a grip 128, which in turn is rigidly secured at 129 to the lower end of the suction pipe 123. The upper end of the suction pipe 123 is supported in a movable manner by a guide track for an up and down movement sufficient to remove a finished product from the mold 1 together with the secondary mold 123 and also laterally for depositing a finished product, for example on a pallet, not shown. The overhead guide track support structure for the pipe 123 is conventional and hence not shown. The lower end of the suction pipe 123 has secured thereto a lifting plate 130 surrounded on its downwardly facing surface by a gasket 131, which is pressed into contact with the rim or edge 113 of the secondary mold 23. When the gasket 131 contacts the rim or edge 113, suction is established by operating the switch 127 and the secondary mold 23 together with its not yet hardened content is easily removed from the primary mold cavity. Incidentally, in FIG. 11 the air ducts inside the primary mold 1 are not shown in any detail, since they are shown in FIGS. 2 and 12. Further, the removal is facilitated by providing the inwardly facing walls of the mold 1 with a slight slant, so that the resulting conical cavity opens upwardly. The slant is shown in an exaggerated manner in FIG. 11.

FIG. 12 shows a sectional view through a modified primary mold 1' in which the side walls are provided with drilled holes 131 forming air ducts leading into the air space 59 in the bottom plate of the mold. The air space 59 may also be provided in the form of machined or drilled holes. The air space 59 is connected to the suction duct 48 through the opening 58 and to the air inlet valve 57 as shown. The side walls and the bottom wall of the mold may be machined separately and then interconnected by screws not shown. A gasket 132 is inserted between the bottom plate of the mold 1' and the turntable 26 and the mold is rigidly mounted to the turntable 26, for example by screws extending through mounting lugs 133. Small holes 134 lead into the air ducts or bores 131. Further, holes 134 lead into the air space 59. These holes 134, 135 may be drilled into the respective mold walls or bottom plate. Their size and distribution is conventional. As disclosed in the above U.S. Pat. No. 4,331,628 , (Ziegler), a further gasket 137 is inserted into a groove 136 in the open top edge of the mold 1'. As stated above, the inner walls of the primary mold may be slightly slanted to facilitate the removal of the secondary mold 23 with its content.

Referring again to FIG. 7, the indexing of the turntable 26 is positively stopped by an arresting pin 138 reaching into a locking hole in a rotating part of the turntable 26. A spring 139 biasses the locking pin 138 into the locking position. A piston cylinder device 140 withdraws the locking pin 138 from the locking position against the force of the spring 139. The piston cylinder device 140 is operated in response to the indexing of the turntable 26. An additional locking mechanism 141 may be provided and operated in synchronism with the locking pin 138. The additional locking mechanism also has a piston operated locking pin 142 reaching into a respective hole in a rim 143 of the turntable 26. One or several locking mechanisms may be employed depending on the inertia forces of the rotating turntable.

With regard to FIG. 8, the plate 34 with a smooth surface 22 is preferably made of stainless steel and its surface 22 may be covered with a release agent, such as a coating of tetraflouroethylene (PTFE). Also a very thin coating of a vegetable oil spray may be suitable as a release agent.

Figure 15:
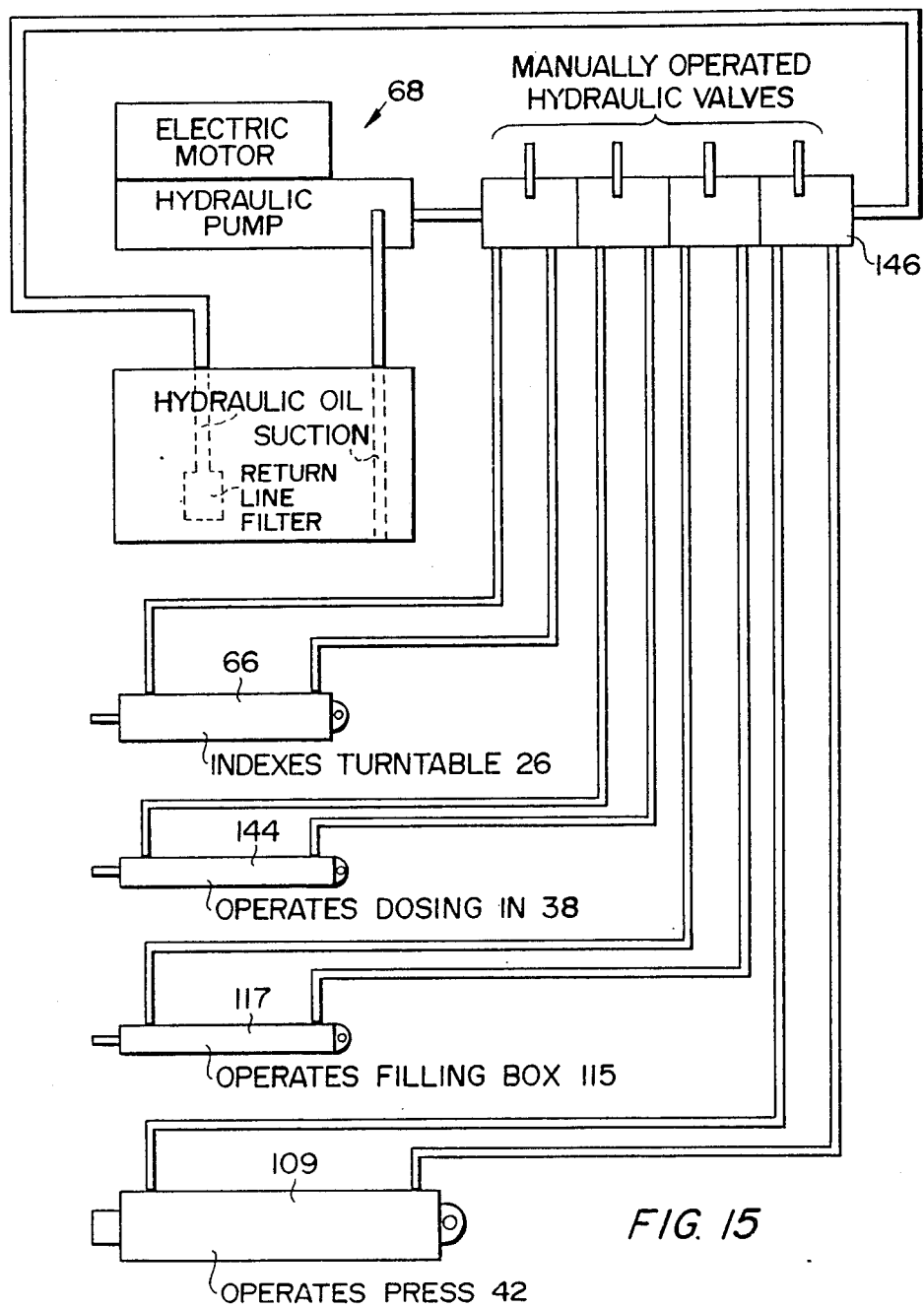
FIG. 15 is a hydraulic circuit diagram of the present apparatus.

The hydraulic circuit diagram of FIG. 15 is self-explanatory, except that it should be mentioned, that the manually operated hydraulic valves 146 are not shown in the other figures. The sequence of the operation of the control valves 146 establishes the entire flow of steps of the apparatus. Such flow of steps may also be controlled by a computer program and the operation of the valves 146 would then be responsive to such a computer program. The remaining piston cylinder devices described above are operated by solenoid drives, one circuit of which is shown in FIG. 16a. Such circuits are conventional as such.

Referring to FIG. 16a, a contact 147 is closed, for example, by the indexing of the turntable 26 with the aid of an appropriate trip dog, not shown. The energization of the relay establishes a holding circuit with the normally closed contact 148 and a relay contact 149 for keeping the relay energized until the holding circuit is interrupted again also by the indexing of the turntable, for example, The energization of the relay also closes a contact 150 for energizing the solenoid to operate a valve and thus the respective piston cylinder device. The sequencing of the plurality of relay circuits may also be part of a computer program, which as such is not part of the present invention.

FIG. 16 with its labels is self-explanatory.

FIG. 17 shows a dosing device 151 in the first auxiliary station 38 for filling a first type of concrete mix into the secondary mold 23. The piston cylinder device 144 drives a piston 152 in a dosing cylinder 153 which is located below a hopper 154 and communicates with the hopper volume through a slot 155 extending through the bottom of the hopper 154 and through the top of the dosing cylinder 153 having an open right hand end above the mold cavity for discharging a determined quantity of concrete mix into the secondary mold 23 when the piston 152 is moved to the right. A motor 145 drives mixing and wiper blades 156 in the hopper 154 to keep the concrete mix agitated.

Although the invention has been described with reference to specific example embodiments, it will be appreciated, that it is intended to cover all modifications and equivalents within the scope of the appended claims. For example, it is conceivable that the removing device is combined with a robot arm for removing the secondary mold 23 with its compacted but not yet effectively hardened concrete mix in a fully automatic manner.

What I claim is:

1. In a method for molding concrete elements in an open top mold having a primary mold cavity defined by walls lined with a thermoplastic film which is first moved onto said open top of said mold, heated and sucked by vacuum into said primary mold cavity which is then filled with a concrete mix for the formation of the element, the improvement comprising the following steps:
    (a) contacting at least that portion of said thermoplastic film which smoothly covers said open top, with a flat heater surface of a solid heating device for uniformly and entirely heating said portion of said thermoplastic film on said open top through said flat heater surface, while simultaneously closing said open top with said solid heating device, said heating softening said film portion sufficiently for pulling the heated film portion into said primary mold cavity by suction,
    (b) evacuating said primary mold cavity while it is still closed by said heating device, sufficiently for lining the primary mold cavity with a secondary mold formed of said thermoplastic film in said primary mold cavity,
    (c) removing the heating device for opening said secondary mold in said primary mold cavity,
    (d) filling the secondary mold in said primary mold cavity with a concrete mix, and
    (e) compacting said concrete mix in said secondary mold while the seconsary mold is still in said primary mold and withdrawing the secondary mold filled with compacted concrete mix from said primary mold cavity prior to any substantially noticeable or effective hardening of said concrete mix in said secondary mold which together with the compacted but not yet effectively hardened concrete mix forms a unit sufficiently shape retaining for an immediate transportation and completing the curing and hardening of the concrete mix in said secondary mold outside said primary mold with the curing concrete mix a sufficiently shape retaining unit so that expansion forces resulting from the hardening and curing are substantially prevented from becoming effective in the primary mold and for permitting the renewed use of said primary mold cavity before the formed concrete mix hardens.

2. The method of claim 1, comprising pulling-off said thermoplastic film from a film supply roller providing a continuous web of film, smoothly drawing said portion of said thermoplastic film onto said open mold top, performing said contacting step, and cutting off said portion from said continuous film web.

3. The method of claim 1, further comprising temporarily increasing the pressure inside said primary mold cavity during said heating for uniformly pressing the entire film portion on said open top against said flat heater surface of said heating device.

4. The method of claim 1, comprising maintaining said flat heater surface of said heater member at a uniform temperature within a temperature range sufficient for making the entire volume of said film portion uniformly supple and pliant in response to said evacuating step.

5. The method of claim 1, wherein said thermoplastic film has a thickness within the range of about 100 $\mu$m to about 300 $\mu$m (about 4 to about 12 mils), for forming said secondary mold in said primary mols cavity.

6. The method of claim 1, wherein said contacting of the thermoplastic film by the flat heater surface is maintained for about 8 to 16 seconds.

7. The method of claim 1, wherein said compacting comprises applying a pressure to the open top mold, said pressure being in the range of about 10 to 80 tons per square foot sufficient for compacting said concrete mix to about 90% of its original uncompacted volume, thereby precisely filling the secondary mold in said primary mold cavity.

8. The method of claim 7, wherein said withdrawing of said filled secondary mold from said primary mold cavity takes place substantially immediately after said compacting, within about 5 to about 20 seconds after the completion of said compacting.

9. The method of claim 1, further comprising inserting a pattern forming member into said primary mold cavity prior to covering said open mold top with said thermoplastic film portion.

10. The method of claim 1, further comprising performing said filling in at least two steps for filling different types of concrete mix into said secondary mold.

11. The method of claim 1, wherein said step of withdrawing is performed by applying suction to said secondary mold for withdrawing the secondary mold with the concrete mix therein, from the primary mold cavity prior to any effective hardening of the concrete mix into a concrete block.

* * * * *

UNITED STATES PATENT AND TRADEMARK OFFICE
CERTIFICATE OF CORRECTION

PATENT NO. : 4,702,877
DATED : October 27, 1987
INVENTOR(S) : Lindsey B. Davis, Jr.

It is certified that error appears in the above-identified patent and that said Letters Patent is hereby corrected as shown below:

```
Column 13, line 42, replace "123" by --23--.
Column 14, line  7, replace "134" by --135--;
           line 10, replace ". As" by --, as--;
           line 11, replace ", a" by --. A--.

Column 15, line 46, replace "seconsary" by --secondary--;
           line 56, delete "with the";
           line 57, delete the entire line.

Column 16, line  1, delete "unit";
           line 27, replace "mols" by --mold--.
```

Signed and Sealed this

Thirteenth Day of December, 1988

Attest:

DONALD J. QUIGG

Attesting Officer

Commissioner of Patents and Trademarks